March 3, 1931.  E. R. WOLCOTT  1,794,431
APPARATUS FOR PUMPING LIQUIDS
Filed Nov. 28, 1927  4 Sheets-Sheet 1

INVENTOR.
Edson R. Wolcott,
BY Arthur P. Knight and
Alfred W. Knight
ATTORNEYS

March 3, 1931.  E. R. WOLCOTT  1,794,431
APPARATUS FOR PUMPING LIQUIDS
Filed Nov. 28, 1927  4 Sheets-Sheet 3

INVENTOR.
Edson R. Wolcott,
BY Arthur P. Knight and
Alfred W. Knight
ATTORNEYS

March 3, 1931. E. R. WOLCOTT 1,794,431
APPARATUS FOR PUMPING LIQUIDS
Filed Nov. 28, 1927  4 Sheets-Sheet 4

INVENTOR.
Edson R. Wolcott,
BY Arthur P. Knight and
Alfred W. Knight
ATTORNEYS

Patented Mar. 3, 1931

1,794,431

UNITED STATES PATENT OFFICE

EDSON R. WOLCOTT, OF LOS ANGELES, CALIFORNIA

APPARATUS FOR PUMPING LIQUIDS

Application filed November 28, 1927. Serial No. 236,134.

This invention relates to apparatus for pumping liquids and particularly an apparatus of the type described in my United States Patent No. 1,628,943 issued May 17, 1927, for pumping liquids through considerable vertical heights, as in pumping oil or other liquid from wells of relatively great depth. While the invention described in said patent and the present improvements thereto are particularly adapted for the pumping of oil from oil wells, the same may also be advantageously used for pumping other liquids.

The principal objects of this invention are to facilitate the assembly and disassembly of successive sections or units of a pumping apparatus of the general type described in said patent and to effectively prevent leakage between the different passages and chambers therein. These objects are accomplished by providing a plurality of pump sections or units, each comprising an outer casing and a plurality of passage means extending therethrough and integrally secured to said outer casing and to one another so as to provide an integral section or unit, and means for quickly and conveniently connecting such pump units together so as to place the corresponding passage means in adjacent units in communication, while preventing leakage from any passage to any other passage at the point of such connection. Special valve units are also provided, which may be interposed between the standard units at suitable intervals to provide the desired number of stages and to properly control the lifting of liquid from each stage to the next stage.

A further object of the invention is to provide means for preventing loss of working fluid through any stage in case of complete displacement of liquid therefrom.

A further object of the invention is to provide advantageous means for lifting oil to the bottom stage of the main pumping apparatus through a portion of the well hole of reduced diameter and extending to a lower depth, such portion of the well hole being of too small diameter to permit insertion of the main pumping apparatus therein without prohibitively reducing the size of the passage means therein.

The accompanying drawings illustrate embodiments of my invention and referring thereto.

Figure 1:
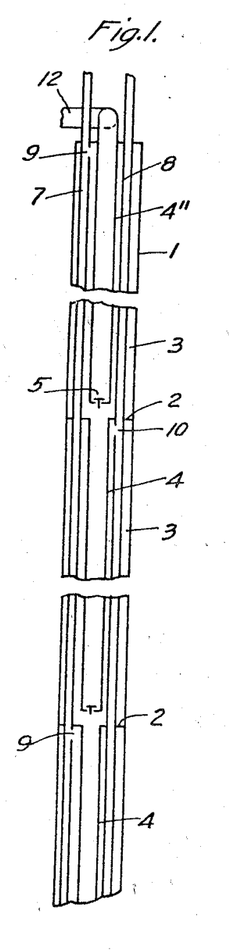
Fig. 1 is a diagrammatic representation of the upper portion of a pumping apparatus such as shown in the above mentioned patent and to which the improvements of the present invention are applicable.
Figure 2:
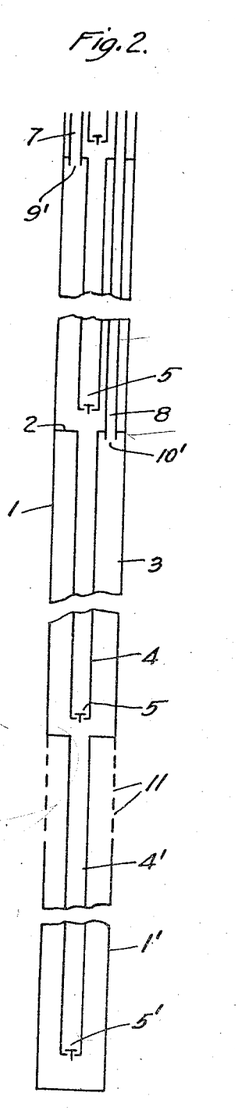
Fig. 2 is a similar view of the lower portion of such pumping apparatus.

The pumping apparatus comprises an outer casing 1 extending throughout the height thereof and partition means 2 at suitable intervals dividing the space within said casing into a plurality of pump chambers or stages 3 located contiguously one above another, passage means 4 for conducting liquid from the lower portion of each pump chamber to the next higher pump chamber, check valve means 5 located in the respective liquid conducting passages and preferably at or near the bottom thereof and adapted to permit only upward flow of liquid therethrough, and two gas passage means 7 and 8 extending substantially throughout the height of the pump and provided at suitable points with openings placing the respective gas passage means in communication with alternate pump chambers. For example the gas passage means 7 is shown as provided with openings 9 communicating with the upper portion of the uppermost stage, the third stage down, and so on throughout the length of the apparatus, while the gas passage means 8 is provided with openings 10 communicating with the second stage and with every alternate stage from there on down. In Fig. 2 the gas passage means 8 is shown as opening at its lower end as at 10', directly into the lowermost pump chamber, while the gas passage means 7 is shown as opening at its lower end as at 9', directly into the next higher pump chamber. Beneath the lowermost stage is provided any suitable length of casing 1' having openings or perforations 11 for inflow of liquid thereto, and liquid conducting passage 4' may extend down inside said casing and be provided with check valve 5' at its lower end, so that liquid may be forced up therethrough into the lowermost pump chamber 3 during the low pressure interval therein.

The liquid conducting passage means 4" leading from the uppermost pump chamber may be connected to a pipe 12 for conducting away the liquid delivered therethrough while passage means 7 and 8 may be connected through suitable manually or automatically controlled valve means to sources of relatively high and relatively low pressures, whereby a condition of relatively high pressure and relatively low pressure may be alternately created in the respective gas passages and hence in the pump chamber connected thereto. Such means for creating high and low pressure in the gas passages and for controlling the duration of each period of high pressure and low pressure in the respective passages may be substantially the same as shown in my above mentioned patent, or any other suitable means, including, for example, any form of properly timed reciprocating or rotating valve, may be employed for this purpose. The valve mechanism may be operated by electric motor, or by a gas operated motor, driven, for example, by a portion of the same gas as is used for the pumping operation.

In order to obtain maximum utilization of the available space within the well, and provide for the maximum size of working chambers and gas and liquid passages, the liquid passage means 4 and gas passage means 7 and 8 are preferably disposed inside the outer casing 1 so that the pump chambers are provided by the spaces inside said casing and around and between said passage means. In practice some difficulty has been experienced in assembling the outer casing and the several passage means therein so as to prevent leakage between the respective passage means and the pump chambers or the exterior of the casing and the pump chambers, while at the same time preventing leakage between successive pump chambers, and one of the main objects of the present invention is to provide a simple means for overcoming these difficulties. One of the causes of trouble has been that unequal expansion of the pipes due to temperature variation therein has caused such a strain upon the joints, and particularly upon the threads thereof and the gasket means used to insure tight joints, as to break or damage these parts and cause leakage to occur, and an important feature of this invention consists in the use of a sectional or unitary construction in which the outer casing and the several internal pipes of each section or unit are integrally secured together. By thus integrally connecting said members at points relatively close together, the strains due to unequal expansion are taken up or resisted uniformly throughout the length of the members instead of being exerted upon the joints and connecting means, thus preventing damage to threads, gaskets and other parts and eliminating the consequent leakage.

Figure 3:
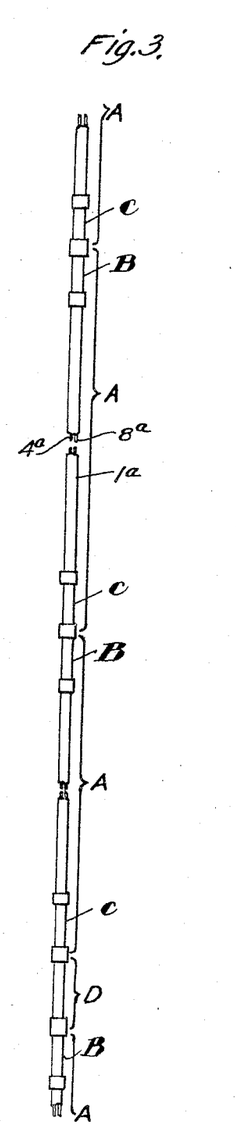
Fig. 3 is a side elevation of a portion of such a pumping apparatus illustrating the sectional or unitary construction of my invention.

While in Figs. 1 and 2 the passage means 4, 7 and 8 are shown as arranged substantially in a single plane, this is merely for the purpose of diagrammatic illustration, and in practice it is much more advantageous to arrange the passage means in a triangular relation to one another as shown in the remaining figures of the drawings. It will also be understood that the height of each stage is much greater than represented in proportion to the diameters of the casing and passage means, and this fact is indicated in Figs. 1 and 2 by breaking away intermediate portions of each stage. Each stage or pump chamber normally extends throughout a height of several hundred feet and as it is impracticable to use individual sections of such great height, each stage is made up by connecting together a plurality of sections or units as indicated at A in Fig. 3.

Figure 4:
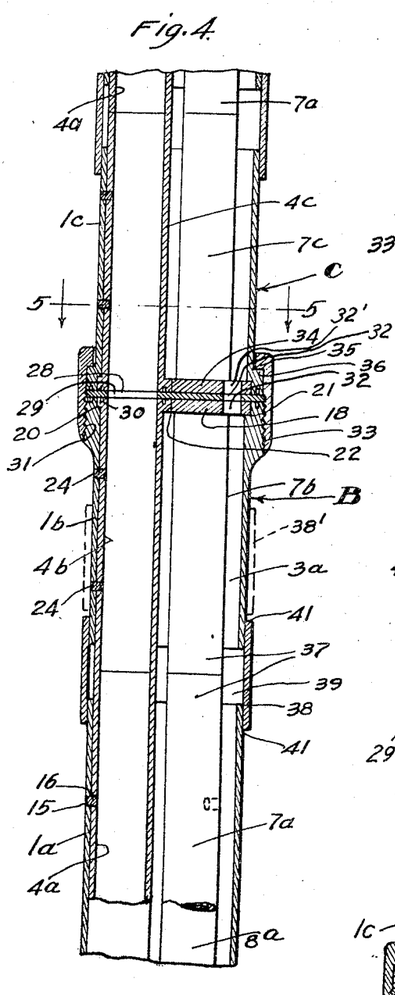
Fig. 4 is a vertical section through the adjacent ends of two successive pump units and the connecting means therefor.

Each of such units comprises a section of the outer casing indicated at 1a and sections of the respective passage means or internal pipes indicated at 4a, 7a and 8a respectively. As indicated in Fig. 4 the several pipe sections 4a, 7a and 8a are integrally secured to the outer casing sections 1a by welding together as indicated at 15. Such welding may be accomplished in any suitable manner as, for example, by disposing the respective internal pipes in contact with the interior of the casing and drilling or otherwise forming holes in the outer casing and the respective internal pipes at the desired points, as at 16, and then filling such holes with metal by a welding operation so as to integrally connect the casing to the several internal pipes at these points. Or, projecting pins or studs may first be welded onto the internal pipe sections and fitted into suitable openings in the outer casing and then welded thereto, or any other suitable means may be employed for integrally securing the casing and internal pipes together. Since all of the internal pipe sections 4a, 7a and 8a are thus integrally connected to the outer pipe or casing section, it is evident that such internal pipe sections are also integrally connected to one another.

Figure 5:
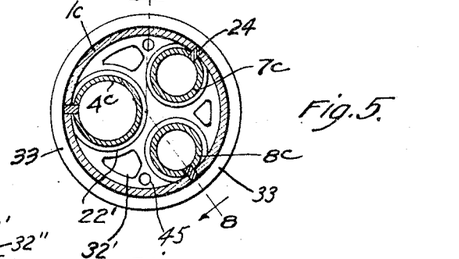
Fig. 5 is a transverse section on line 5—5 in Fig. 4.
Figure 6:
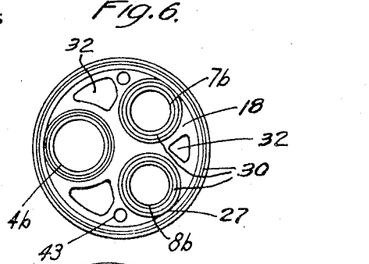
Fig. 6 is an end view of one of the standard pump units.
Figure 7:
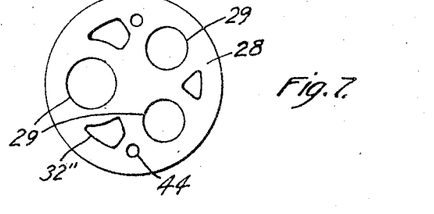
Fig. 7 is a plan view of a form of gasket which may be used to provide a tight connection between units.
Figure 8:
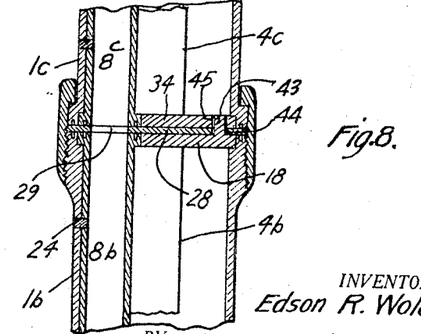
Fig. 8 is a section through the adjoining ends of two successive units taken on line 8—8 in Fig. 5.

The several units A are provided at their upper and lower ends with top and bottom coupling or end portions B and C, the several pipe and casing sections being connected at their upper ends with coupling members 1b, 4b, 7b and 8b respectively and at their lower ends with coupling members 1c, 4c, 7c and 8c. The entire upper coupling portion consisting of the said top coupling members and an end plate 18, may be first assembled as an integral unit separate from the main pipe and casing sections above mentioned. Each top coupling member of the internal pipes may be provided with a shoulder at its upper end as indicated at 20, and the upper end of the coupling member 1b of the outer casing may be correspondingly recessed as indicated at 21, the end plate 18 being shaped to fit within such recess and around the shoulders 20 on the several internal pipes as shown in Figs. 4 and 6. The top coupling members of the several internal pipes may first be assembled on the plate 18 and welded thereto as at 22 (and as indicated more clearly at 22' in Fig. 5 for the corresponding bottom coupling members hereinafter described). The elements thus assembled may be inserted into the coupling member 1b of the outer casing section and may be integrally secured thereto, as by welding at suitable intervals as indicated at 24. The plate 18 may also be welded to the upper end of member 1b and the shoulders 20 on the several internal members may also be welded thereto at the points of tangency as at 27, but this is not always necessary, since a tight joint is insured between these parts, regardless of such welding, by means of the gasket 28. After the top coupling portion is thus completely assembled the upper or end face thereof may, if necessary, be smoothed off so as to insure a tight fit against the gasket 28 over the entire area of such end face. The coupling members 1b, 4b, 7b and 8b may be grooved at their upper ends as indicated at 30 so as to permit the gasket 28 to be forced into said grooves and insure a tight joint when the sections are connected together. The upper end of coupling member 1b may be externally threaded as indicated at 31. Plate 18 is provided with suitable openings 32 in the portions thereof between the several pipes for the purpose of permitting communication between the pump chamber spaces 3a of successive units.

Bottom coupling members 1c, 4c, 7c and 8c, and bottom plate 34 may be formed and secured together in substantially the same manner as the top coupling members above described. Each bottom coupling portion so formed may be provided with an internally threaded collar 33 adapted to screw on the threaded upper end 31 of the next lower unit and having a shoulder 35 engaging shoulder 36 on such bottom coupling member as hereinafter described. Plate 34 and gasket 28 are provided with openings 32' and 32'' lining up with openings 32 in plate 18. One of the plates 18 or 34 may be provided with lugs 43 passing through openings 44 and 45 in the gasket 28 and in the other of said plates, so as to prevent relative turning of adjacent units when being connected together and preserve alignment between the successive sections of the internal pipes. The top and bottom coupling portions thus formed may then be integrally secured in any suitable manner to the respective ends of the several sections or units comprising members 1a, 4a, 7a and 8a. For this purpose the several sections of the internal pipes and of the internal coupling members may project somewhat beyond the ends of the corresponding sections of outer casing as indicated at 37, and suitable sleeves 38 may be provided for subsequently closing the open space thus afforded between the main section of outer casing and the coupling member thereof, as indicated at 39. For assembling purposes the sleeve 38 may be slid to some such position as indicated in dotted lines at 38' and the projecting portions 37 of the several internal pipes may be abutted against one another and welded together, access thereto for this purpose being permitted through the openings 39 above mentioned. The sleeve 38 may then be moved to position to close said opening and may be secured as by welding to the adjoining portions of the outer casing as indicated at 41.

It will be seen that each unit A of the apparatus therefore comprises outer casing means and a plurality of internal passage means or pipes, all integrally secured together and having means at their ends for coupling adjacent units together so as to properly align the successive sections of the several internal passages and to effectively prevent leakage either of the gaseous working fluid or of the liquid being pumped, from any passage into any other passage. As each of these units is lowered into the well the next higher unit is brought into position of proper alignment therewith and the collar 33 is screwed down tightly upon the threaded portion 31 so as to compress gasket 28 tightly between plates 18 and 34 and provide the necessary fluid tight joint between all of the internal passages and also between the successive sections of pump chamber 3. Each gasket 28 is provided with openings 29 aligned with the several pipes 4, 7, and 8.

Figure 9:
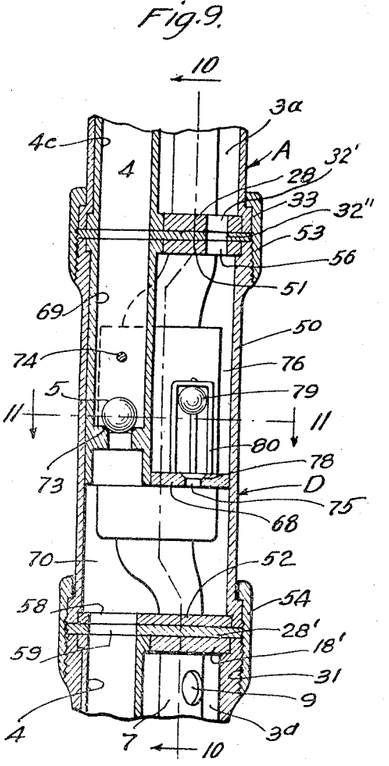
Fig. 9 is a vertical section through a special valve unit and the means connecting the same to the adjoining standard units.
Figure 10:
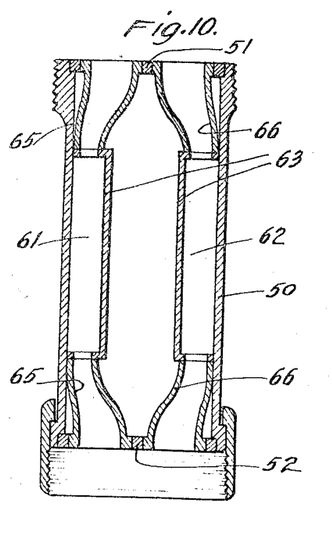
Fig. 10 is a section on line 10—10 in Fig. 9.
Figure 11:
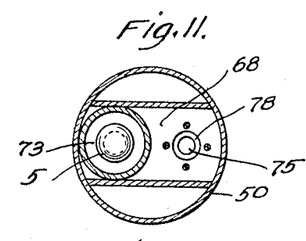
Fig. 11 is a section on line 11—11 in Fig. 9.

Special valve units D are inserted at suitable intervals throughout the height of the pump, dependent upon the height of each single lift which may be obtained with the available difference in pressure. One form of valve unit suitable for this purpose is illustrated in Figs. 9 to 11. Such valve unit comprises a section of outer casing 50, which may be of the same diameter as the main portion of casing 1 and is provided at its upper and lower ends with end plates 51 and 52 which may integrally be secured thereto in any suitable manner. The upper end of casing section 50 is externally threaded as at 53 to receive the collar 33 of the adjacent main casing section A, while a collar 54 may be provided at the lower end thereof for engaging the threaded portion 31 of the next lower casing section. A gasket 28 may be provided between the top of valve section 50 and the bottom of the next casing section, which may be the same as the gaskets provided between the successive standard pump units, and the upper plate 51 is provided with openings 56 corresponding to the openings 32'' in said gasket so as to complete the means of communication between the space within casing section 50 and the pump chamber 3a thereabove. A gasket 28' may also be provided between the bottom of the valve section and the top plate 18' of the next lower main casing section, but it will be noted that plates 18' and 52 and gasket 28' are not provided with openings establishing communication between the interior of the valve unit and the next lower pump chamber section 3a. These three members together form the partition means 2 shown in Figs. 1 and 3 between the successive pump chambers. One of the openings 9 in passage means 7 is shown in Fig. 9 directly below such partition means. Plate 52 and gasket 28' are, however, provided with openings 58 and 59 for establishing communication between the next lower liquid conducting passage means 4 and the interior of casing section 50.

Means are also provided within the valve unit D for maintaining the connection of the gas passage means 7 and 8 therethrough, but in order to make room for the valve means hereinafter described I prefer to form these connecting means, at the intermediate portion of the valve unit, by means of special compartments 61 and 62 inclosed and separated from the remainder of the space within casing section 50 by means of walls 63. Said walls may be integrally secured to the casing section 50 or may be secured thereto in any other suitable manner so as to provide a fluid tight construction. Special neck portions 65 and 66 are provided above and below the chambers 61 and 62 for establishing connection between said chambers and the respective gas passage means 7 and 8, said neck portions being secured to the plates 51 and 52 in the same manner as the coupling members 7b and 8b and 7c and 8c are connected to the corresponding end plates of the top and bottom coupling means above described.

At an intermediate height in the valve unit D a horizontal partition plate 68 is provided and a pipe 69 extends from said partition plate to the upper end of said valve unit and communicates at its lower end with the chamber 70 below said partition plate and at its upper end with the coupling member 4c of the next higher unit. The pipe 69 may be connected integrally to plate 51 and partition plate 68 or in any other manner so as to provide a fluid tight construction. Within pipe 69 is provided one of the valves 5, comprising, for example, a ball check valve operable by gravity to engage seat 73 and prevent communication between the liquid passage means thereabove and chamber 70, except upon application of pressure from beneath in excess of that existing above the valve, at which time the valve is raised against a stop pin 74 and permits upward flow of liquid therethrough.

Partition plate 68 is also provided with an opening 75 establishing communication between chambers 70 and the chamber 76 above said partition plate. In order, however, to cut off such communication upon complete displacement of liquid from the pump chamber directly above any particular valve section, including chamber 76, I prefer to provide valve seat 78 in passage 75 and a ball valve member 79 of less specific gravity than the liquid to be pumped so that as long as there is any liquid in chamber 76 said valve member will tend to rise and permit flow of liquid through opening 75. A cage 80 may be provided for limiting the upward movement of valve member 79 and retaining it in such position that it will always come to rest upon the valve seat 78 and close the opening 75 in case of complete removal of liquid from chamber 76. The valve member 79 may be a hollow ball of steel or other metal, the hollow space therein being sufficiently large to make the entire ball of less specific gravity than the oil or other liquid to be pumped, or it may be formed of light wood or other material naturally possessing a lighter specific gravity than the oil or other liquid to be pumped.

The operation of the above described apparatus is substantially the same as described in my United States patent above referred to. During one period of the operation, air, natural gas or other gaseous fluid is supplied under relatively high pressure through pipe 7 into the pump chambers connected therewith through openings 9 and 9', while a relatively low pressure is maintained in pipe 8 and in the pump chambers connected therewith through openings 10 and 10'. This may be accomplished as descrbed in said patent, by connecting said pipes through suitable automatic valve means to the high and low pressure sides respectively of a compressor or pumping apparatus. During this period oil flows by gravity into the lowermost pump chamber in which a condition of relatively low pressure exists, while oil is simultaneously forced from the next higher pump chamber into the one above and so on throughout the height of the pump. At this time the check valve 5' leading into the lowermost stage is open while the check valve 5 leading from the lowermost stage into the next higher stage is closed and so on alternately throughout the height of the pump. After a suitable period of time such as may be found necessary to cause substantially entire displacement of the oil from one stage to the next, the conditions of relatively high and relatively low pressure in the respective pump chambers are reversed, so that the oil is displaced from the lowermost pump chamber 3 into the next higher pump chamber and so on throughout the height of a pump.

It is evident that under these conditions temperature variations are apt to occur in the respective pipes, and the effect of the above described integral construction of the successive sections of the pump is to prevent relative movement of the respective pipes and the outer casing and the consequent tendency to loosen the joints between these members. The joints are thus maintained substantially fluid tight at all times and leakage is substantially eliminated. This elimination of leakage is of great importance to the satisfactory operation of the pump, as it will be seen that any leakage of the gaseous working fluid from one of the gas passages to a pump chamber not intended to be in communication therewith, or from one pump chamber to the next, will cause certain of the pump chambers to be incompletely filled with oil during each period of operation and the pump will, therefore, deliver an incomplete charge of oil at each cycle.

Referring to the valve unit shown in Figs. 9 to 11, it will be seen that when this valve unit and the pump chamber directly above the same are filled with oil the float valve 79 will remain in the position shown. Upon application of high pressure to said pump chamber, such oil will, therefore, be displaced through passage 75 and pipe 69 into the liquid conducting passage 4 leading to the next higher pump chamber, the check valve 5 being at this time raised off its seat 73 due to the excess pressure from beneath. In case of complete displacement of the oil from the first mentioned pump chamber and the chamber 76 of the valve unit, the valve 79 will be lowered to position against valve seat 78 and thus cut off communication with chamber 70 and passage 69, so as to positively prevent passage of the gaseous working fluid upwardly through the liquid conducting passage 4 into the next higher pump chamber. An advantage of this float valve arrangement is that a pressure somewhat in excess of that actually required to lift the oil from one pump chamber to the next may be employed, thus permitting the desired pressure to be maintained even in the lowermost pump chambers and permitting the necessary amount of gas to be delivered to said lowermost chambers in a shorter period than would be possible if the pressure at the upper end of the gas passages had to be kept below the actual pressure required to effect the lifting operation. It will be evident that if an excess pressure were maintained at the top of the gas passage, without some such provision, the uppermost pump chambers would be emptied first and the gas would then be by-passed through such chambers into the low pressure gas passage, thus preventing further lifting action in the lowermost pump chambers.

Figure 12:
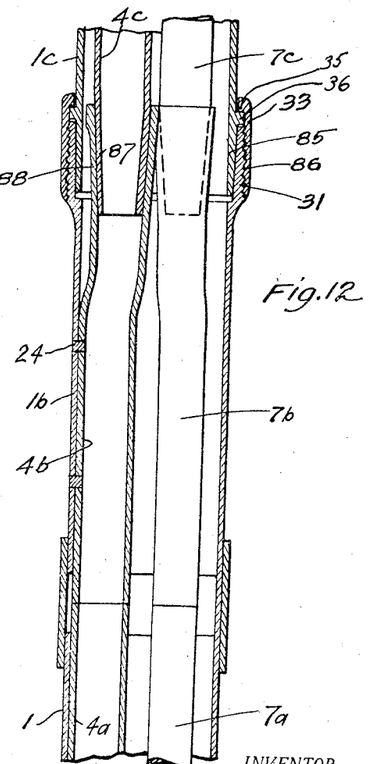
Fig. 12 is a view similar to Fig. 4 showing a modified means of connecting successive units together.

A modified means of connecting the successive units of the pump together is shown in Fig. 12. In this case end portions 1b, 4b, 7b, etc. are connected to the upper end of the casing and pipe sections 1, 4, 7, etc., for example, in the same manner as above described, and end portions 1c, 4c, 7c, etc. are connected to the lower ends of said section in a similar manner. The portions 1c and 1b of the outer casing are provided with tapered portions 85 and 86 respectively, fitting within one another, while the end portions of the several internal pipe sections are provided with similar tapered portions 87 and 88. Coupling means 31 and 33 may be provided for clamping the successive units together as in the modification above described, the connecting portions of the internal pipes being so arranged with respect to one another and to the connecting portions of the outer casing as to cause the taper joint means thereon to be all brought into position of tight engagement simultaneously, so as to provide a substantially fluid tight connection between the successive sections of the outer casing and of the several internal pipes. The integral connection of the several internal pipes to the outer casing at points distributed throughout the length of each section will, as before, substantially prevent relatively endwise movement of said members and thus prevent loosening of the joints even in case of unequal heating or cooling of said members.

Figure 13:
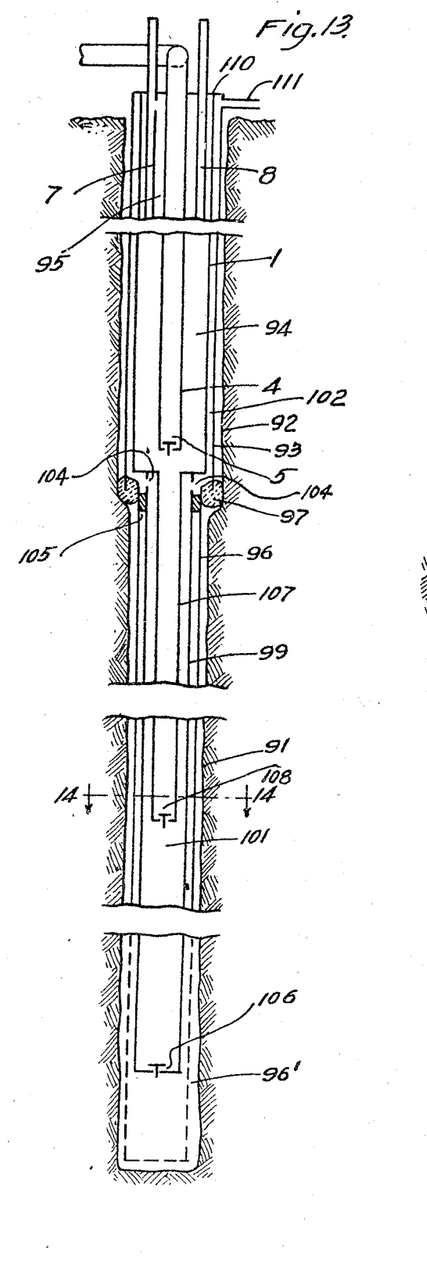
Fig. 13 is a diagrammatic vertical section showing a form of the invention for use in wells of which the lower portion is of reduced diameter.
Figure 14:
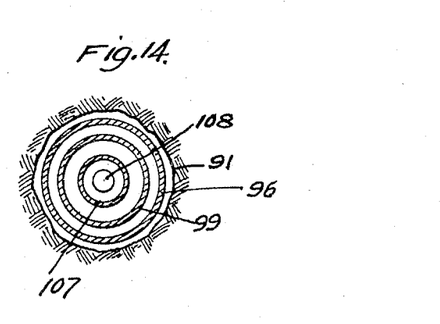
Fig. 14 is a horizontal section on line 14—14 in Fig. 13.

In Figs. 13 and 14 is shown a modification of the invention which is applicable with advantage in the case of oil wells in which the lower portion of the hole as indicated at 91, is of smaller diameter than the upper portion 92 and is of such small diameter as to render it impracticable to insert therein the standard pumping apparatus consisting of the outer casing 1 and the pipes 4, 7 and 8 as above described. In this case the pump apparatus above described may extend down only to the level of the lower end of the casing 93 in the larger diameter portion of the hole. The lowermost standard pump chamber is indicated at 94 and the lowermost liquid conducting passage at 95. This portion of the pumping apparatus comprises outer casing 1, liquid conducting passage means 4, gas passage means 7 and 8 and check valves 5 substantially as above described and also partition means at suitable intervals, as above described serving to define the successive pump chambers.

The space between the large diameter casing 93 and the smaller diameter casing 96 extending into the lower portion of the hole is usually sealed off, as by the well known cementing operation, such cement seal being indicated at 97. The lower portion of casing 96 may be perforated as indicated at 96'. Within the casing 96 is provided a suitable length of tubing or casing 99 extending downwardly from the bottom of the casing 1 to the desired depth in the hole. The chamber 101 within said casing is placed in communication with the annular space 102 between casing 1 and casing 93, as by means of openings 104, and packing means 105 of any suitable or well known type may be provided between tubing 99 and casing 96 below said openings. A check valve 106 is provided at the bottom of tubing 99, to permit flow of liquid from the hole into the chamber 101, but to prevent flow in the reverse direction. A liquid conducting passage or pipe 107 extends downwardly from the bottom of the lowermost pump chamber 94 to a suitable depth within the chamber 101 and may be provided with a check valve device 108 operable to permit flow of liquid from chamber 101 into passage 107 and hence into pump chamber 94 but to prevent flow in the reverse direction. The annular space 102 between casing 1 and casing 93 may be closed at its upper end as indicated at 110 and a pipe or gas passage means 111 may be connected to said space, so as to provide for alternate application of relatively high pressure and relatively low pressure through such space and through the openings 104 into chamber 101.

In the operation of this form of the invention, oil may first be permitted to flow into the chamber 101 through check valve 106, by maintaining a relatively low pressure in said chamber, by exhausting air or gas therefrom through openings 104, annular space 102 and pipe 111. After a suitable period of time a relatively low pressure may be applied to pipe 111 in any suitable manner and gaseous working fluid under pressure may be forced in through said pipe, annular space 102 and openings 104 into chamber 101, thus displacing oil from said chamber through check valve 108 and passage 107 into the lowermost pump chamber 94 of the main pumping apparatus. The means extending into the reduced diameter portion of the hole, therefore, provide in effect an artificial submergence of the lower portion of the main pumping apparatus and permit oil to be delivered into the lowermost pump chamber 94 thereof in cases where the oil would not naturally flow into such chamber by gravity.

The terms "relatively high pressure" and "relatively low pressure" as used in this specification are intended to denote any pressures which differ from one another by an amount sufficient to produce the desired lifting action. The relatively low pressure is preferably either a vacuum or substantially atmospheric pressure in order to produce the maximum lifting action for a given value of the relatively high pressure; but the invention should also be understood to include any case in which the relatively low pressure is itself somewhat greater than atmospheric pressure.

While the invention has been described above as particularly applied to the pumping of oil from wells, it will be understood that it may also be used for the pumping or lifting of any liquid through considerable heights.

I claim:

1. In apparatus for pumping liquids, in combination with an oil well hole whose upper portion is of relatively large diameter and whose lower portion is of reduced diameter, a relatively large casing extending vertically within said upper portion of the hole, a pumping apparatus extending downwardly to adjacent the bottom of said casing, a smaller casing extending downwardly beneath said pumping apparatus and within said reduced diameter portion of the hole, a tubular member extending within said smaller casing from the bottom of said pumping apparatus to beneath the liquid level in said hole, check valve means adjacent the lower end of said tubular member and operable to permit flow of liquid into said tubular member while preventing outward flow of liquid therefrom, means establishing communication between the interior of said tubular member at the upper portion thereof and the annular space between said relatively large casing and said pumping apparatus, means sealing the space between the lower end of said relatively large casing and the upper end of said smaller casing, means sealing the annular space between said tubular member and said smaller casing so as to prevent passage of gas therethrough, a liquid conducting passage extending upwardly from a position intermediate the height of said tubular member and communicating at its upper end with the bottom of said pumping apparatus, a check valve in said liquid conducting passage and permitting only upward flow of liquid therethrough, and means for removing gas from and delivering gas to the annular space between said relatively large casing of the hole and said pumping apparatus.

2. In apparatus for pumping liquids, a pump unit comprising a section of outer casing and a section of pipe inside said outer casing and providing a liquid passage within said pipe and a pump chamber within said outer casing and around said pipe; a valve unit comprising a section of outer casing having a chamber therein, a liquid conducting member within said outer casing and communicating with said last named chamber, and a check valve permitting flow of liquid from said last named chamber into said liquid conducting member while preventing flow in the reverse direction; and means securing said valve unit to the lower end of said pump unit and providing a fluid tight connection between the outer casing sections of said units and also between the pipe section of said pump unit and the liquid conducting member of said valve unit, and also permitting communication between the pump chamber in said pump unit and the chamber in said valve unit.

3. A construction as set forth in claim 2, said valve unit also comprising a partition extending across said chamber therein and between the upper end of said chamber and the point of communication between said chamber and said liquid conducting member, said partition being provided with an opening permitting passage of liquid therethrough, and a valve member movable by gravity into position to close said opening, said valve member being lighter than the liquid to be pumped so as to be raised out of such position when the space above said valve member contains such liquid.

4. In apparatus for pumping liquids, two pump units, each comprising a section of outer casing, a section of liquid conducting pipe, and sections of two gas conducting pipes, said pipe sections extending within the respective outer casing sections and throughout the length thereof so as to provide a pump chamber section within each casing section and around the corresponding pipe sections; a valve unit comprising a section of outer casing having a chamber therein, two gas passage means therein and extending throughout the length thereof, a liquid conducting member therein and extending downwardly from the top of said valve unit and communicating with said chamber in the valve unit, and a check valve permitting flow of liquid from said chamber into said liquid conducting member while preventing flow in the reverse direction; and means securing said valve unit in position between said pump units, and providing fluid tight connections between said gas passage means and the respective gas conducting pipes and between said liquid conducting member in the valve unit and the liquid conducting pipe in the upper pump unit, while permitting communication between said chamber in the valve unit and the liquid conducting pipe in the lower pump unit and also between said chamber in the valve unit and the pump chamber in the upper pump unit and preventing communication between said chamber in the valve unit and the pump chamber in the lower pump unit.

5. In apparatus for pumping liquids by displacement with a displacing fluid, a series of vertically superposed pump units, each of said units comprising a section of outer casing, a section of liquid conducting pipe and sections of two displacing fluid pipes, all of said pipe sections of each unit extending within and throughout the entire length of the casing section of said unit and being rigidly secured thereto, means connecting said pump units together in such manner as to provide communication between the corresponding pipe sections throughout the series of units and also between the spaces around the pipe sections and inside the outer casing sections throughout the series of units, said connecting means providing fluid-tight connections between the casing and pipe sections of the several units, said pipe sections of all the units cooperating to define a continuous liquid conducting passage and two continuous displacing fluid passages extending throughout the height of the series of units and the connected spaces around the pipe sections and inside the outer casing sections constituting a pump chamber extending throughout the height of the series of units, means closing the upper and lower ends of said pump chamber, a check valve associated with said liquid conducting passage permitting only upward flow of liquid therethrough, the lowermost pipe section of said liquid conducting passage being provided with an opening establishing communication between the lower portion of said passage and said pump chamber, and the uppermost pipe section of one of said displacing fluid passages being provided with an opening establishing communication between the upper portion of said fluid passage and said pump chamber.

6. An apparatus as set forth in claim 5, said connecting means including gasket means held in position between the ends of adjacent pump units and provided with openings establishing communication between the corresponding passage means and the spaces around the passage means and inside the outer casing in adjacent pump units, and coupling means connecting together adjacent pump units and clamping said gasket means tightly therebetween.

In testimony whereof I have hereunto subscribed my name this 14th day of November, 1927.

EDSON R. WOLCOTT.